United States Patent
Vaynriber et al.

(10) Patent No.: US 10,073,929 B2
(45) Date of Patent: Sep. 11, 2018

(54) SECURITY SYSTEM USING VISUAL FLOOR PLAN

(71) Applicant: ADT US HOLDINGS, INC., Boca Raton, FL (US)

(72) Inventors: Dmitry Vaynriber, Sunny Isles Beach, FL (US); Brian King, Coral Springs, FL (US); Molly Byer, Argyle, TX (US); Raymond North, Boca Raton, FL (US); Jocelyne Norris, Fort Lauderdale, FL (US)

(73) Assignee: ADT US Holdings, Inc., Boca Raton, FL (US)

( * ) Notice: Subject to any disclaimer, the term of this patent is extended or adjusted under 35 U.S.C. 154(b) by 706 days.

(21) Appl. No.: 14/213,892

(22) Filed: Mar. 14, 2014

(65) Prior Publication Data

US 2014/0278281 A1    Sep. 18, 2014

Related U.S. Application Data

(60) Provisional application No. 61/789,107, filed on Mar. 15, 2013.

(51) Int. Cl.
*G06F 17/50* (2006.01)

(52) U.S. Cl.
CPC ........ *G06F 17/5004* (2013.01); *G06F 17/509* (2013.01); *G06F 2217/02* (2013.01)

(58) Field of Classification Search
CPC . G06F 17/5004; G06F 17/509; G06F 2217/02
See application file for complete search history.

(56) References Cited

U.S. PATENT DOCUMENTS

| 5,943,673 | A  | * | 8/1999 | Felouzis | G08B 26/001 |
| 6,680,746 | B2 | * | 1/2004 | Kawai | H04N 5/232 |
| | | | | | 348/14.07 |
| 6,861,951 | B2 | * | 3/2005 | Reghetti | G06F 17/50 |
| | | | | | 340/286.05 |
| 7,378,942 | B2 | * | 5/2008 | Seeley | G06Q 10/10 |
| | | | | | 340/286.01 |
| 8,458,301 | B1 | * | 6/2013 | Andrus | H04L 41/0816 |
| | | | | | 709/220 |

(Continued)

FOREIGN PATENT DOCUMENTS

WO    WO03030550 A1 *  4/2003  ....... G08B 13/19602

OTHER PUBLICATIONS

Henrik Dibowski, et. al., Automated Design of Building Automation Systems, IEEE Transactions on Industrial Electronics, vol. 57, No. 11, Nov. 2010, p. 3606-3613.*

(Continued)

*Primary Examiner* — Omar F Fernandez Rivas
*Assistant Examiner* — Justin C Mikowski
(74) *Attorney, Agent, or Firm* — Christopher & Weisberg, P.A.

(57) ABSTRACT

An apparatus for a premises based system is provided. A processor may be configured to generate a layout (such as a floor plan layout) of at least a portion of a premises to be monitored by the premises based system and populate the layout with at least one premises device. The processor may be further configured to cause layout data associated with the populated layout to be stored.

28 Claims, 13 Drawing Sheets

(56) References Cited

U.S. PATENT DOCUMENTS

| | | | |
|---|---|---|---|
| 8,482,609 B1* | 7/2013 | Mishra | H04N 7/181 348/143 |
| 8,773,254 B2 | 7/2014 | Piccolo, III | |
| 8,817,102 B2* | 8/2014 | Saeki | G08B 13/19613 348/154 |
| 8,934,017 B2* | 1/2015 | Chen | H04N 7/181 348/159 |
| 2002/0035408 A1* | 3/2002 | Smith | G06F 17/5004 700/97 |
| 2005/0038636 A1* | 2/2005 | Wakelam | G06F 17/5004 703/1 |
| 2005/0071136 A1* | 3/2005 | Vredenburgh | G06F 17/5004 703/1 |
| 2005/0193389 A1 | 11/2005 | Murphy et al. | |
| 2006/0190228 A1* | 8/2006 | Johnson | G06F 17/5004 703/13 |
| 2007/0078635 A1* | 4/2007 | Rasmussen | G06F 1/20 703/1 |
| 2008/0062167 A1* | 3/2008 | Boggs | G06F 17/5004 345/419 |
| 2008/0094204 A1 | 4/2008 | Kogan et al. | |
| 2008/0221714 A1 | 9/2008 | Schoettle | |
| 2009/0074184 A1 | 3/2009 | Baum et al. | |
| 2010/0332605 A1* | 12/2010 | Hutchison | H04L 67/2814 709/206 |
| 2011/0243115 A1* | 10/2011 | Chen | H04W 8/245 370/338 |
| 2011/0251807 A1 | 10/2011 | Rada et al. | |
| 2012/0078833 A1* | 3/2012 | Johnson | G06N 5/025 706/47 |
| 2012/0203562 A1 | 8/2012 | Krebs et al. | |

OTHER PUBLICATIONS

Moustafa Alzantot, et. al., CrowdInside: Automatic Construction of Indoor Floorplans, ACM SIGSPATIAL GIS '12 Nov. 6-9, 2012. Redondo Beach, CA, USA.*

Final Office Action dated Jun. 3, 2016, in U.S. Appl. No. 14/210,877, filed Mar. 14, 2014, consisting of 15 pages.

Garaas, "Sensor Placement Tool for Rapid Development of Video Sensor Layouts", Proceedings of the 2011 Symposium on Simulation for Architecture and Urban Design, Apr. 3, 2011, pp. 134-137, XP055125368, Retrieved from the Internet: URL:http://dl.acm.org/citation.cfm?id=2048553&bnc=1 on Jun. 26, 2014.

Becker et al., "Automatic Sensor Placement in a 3D Volume", Proceedings of the 2nd International Conference on Peravsive Technologies Related to Assistive Environments, Petra '09, Jun. 9, 2009, pp. 1-8, XP055125372, New York, New York, USA, ISBN: 978-1-60-558409-6.

International Search Report and Written Opinion dated Jul. 3, 2014 for International Application Serial No. PCT/US2014/029459, International Filing Date: Mar. 14, 2014, consisting of 12 pages.

Office Action dated Nov. 6, 2015, in U.S. Appl. No. 14/210,877, filed Mar. 14, 2014, consisting of 17 pages.

Non-Final Office Action dated Sep. 12, 2016, in U.S. Appl. No. 14/210,877, filed Mar. 14, 2014, consisting of 16 pages.

* cited by examiner

| | Order Summary 96 | | | |
|---|---|---|---|---|
| | Devices to be Installed 98 | | | Place Order |
| Devices | First Floor | 2nd Floor | Basement | Total |
| Window Contacts | 3 | 0 | 0 | 3 |
| Door Contacts | 4 | 0 | 0 | 4 |
| Glass Breaks | 5 | 0 | 0 | 5 |
| Motion Detectors | 3 | 3 | 1 | 5 |
| Smoke Detectors | 3 | 2 | 2 | 7 |
| CO Detectors | 2 | 1 | 1 | 4 |
| Camera | 3 | 1 | 0 | 4 |
| Light Switches | 4 | 4 | 4 | 10 |
| Thermostats | 1 | 1 | 0 | 2 |
| Locks | 1 | 0 | 0 | 1 |

Pricing 100

| ITEM | QTY | Unit FEE | Installation FEE | Monthly FEE |
|---|---|---|---|---|
| Platinum Package: 2 Smoke, 4 Door Contacts, 2 motion, 2 Light Switches, 1 Camera, 1 Thermostat | 10 | $399.00 | $399.00 | $49.95 |
| Window Contacts | 3 | $10.00 | $10.00 | $0.00 |
| Glass Breaks | 4 | $19.99 | $99.99 | $0.00 |
| Motion Detectors | 5 | $19.99 | $59.99 | $0.00 |
| Smoke Detectors | 3 | $29.99 | $29.99 | $15.00 |
| CO Detectors | 3 | $29.99 | $129.99 | $16.00 |
| Camera | 2 | $99.99 | $299.99 | $0.00 |
| Light Switches | 3 | 29.99 | 269.99 | $0.00 |
| Thermostats | 4 | $129.99 | $129.99 | $0.00 |
| Locks | 1 | $129.99 | $129.99 | $0.00 |
| Total | | | $1668.57 | $80.99 |

*FIG. 14*

SECURITY SYSTEM USING VISUAL FLOOR PLAN

CROSS-REFERENCE TO RELATED APPLICATION

This application is related to and claims priority to U.S. Provisional Patent Application Ser. No. 61/789,107, filed Mar. 15, 2013, entitled "SECURITY SYSTEM USING VISUAL FLOOR PLAN", the entirety of which is incorporated herein by reference.

FIELD OF THE INVENTION

The invention relates to premises-based systems that centrally control a plurality of separate devices and in particular to premises based system design, implementation and configuration using a visual layout.

BACKGROUND OF THE INVENTION

The demand for systems that use a variety of devices at a location to monitor a variety of conditions, such as monitoring homes and businesses for alarm conditions, allowing users to centrally control various devices (such as thermostats, switches, cameras, appliances, etc.), monitor medical conditions, and the like has continued to grow as more home and business owners seek better control over their premises and to protect it from various hazards and threats. Such hazards and threats include intrusion, fire, carbon monoxide and flooding, among others dangers that may be monitored and reported to a monitoring station.

Conventional systems typically employ a control panel and/or gateway that receive "event" (such as triggering alarms) and other information from various sensors and devices, and is used to operate them. This may be done locally by the user, or remotely via a monitoring center. In the case of alarm events, the monitoring center can also take appropriate action, such as notifying emergency responders. Installation and servicing complexity associated with these systems tends to be high, as an installer has to physically position, mount, and configure the control panel and all of the various sensors, while taking into account a variety of performance characteristics and requirements for each device to ensure proper operation of the system. These systems also typically incorporate a manufacturer's specific technology designed for the manufacturer's security application, and only certain devices may only appropriately interoperate with other devices in certain ways. This is true as well for more recent all-in-one (AIO) security systems, in which the control panel and a user interface (such as a keypad) are combined in a single unit, even portable AIO systems where the control panel may be relocated around the premises and not permanently installed. For example, such units may sit on top of a table or on the floor, but nevertheless communicates with life safety sensors in a similar manner as a wall-mounted security panel.

Both conventional Home security and automation (HS&A) and AIO systems still typically require a customer to select a specific security system package without really knowing all of the technical factors involved to best ensure that a specific system meets the customer needs for a specific location. For example, the customer may selects the "best" security system package that includes more sensors than other packages but the customer does so without knowing whether or not the extra sensors will further improve the operation of the system at a specific premises.

HS&A systems are thus often selected based on number of features and capabilities (i.e., "good," "better," "best) without much information as to the optimal system configuration that meets the customer's needs for a particular location. In some cases, the "best" or highest price package may be beyond the customer's specific needs, while in other "base" system package, may not fully meet the customer's needs at that location.

Furthermore, the installation location of the sensors is typically left to the individual installer such that different installers may recommend or install sensors in different locations for the same premises. For example, one installer may place sensors in different locations than another installer such that security system performance will vary for that location. The customer has little way of knowing if the installed security system efficiently maximizes system operation.

SUMMARY OF THE INVENTION

The invention advantageously provides a method and system for premises-based systems that centrally control a plurality of separate devices and in particular to premises based system design, implementation and configuration using a visual layout.

According to one embodiment, an apparatus for a premises based system is provided. A processor may be configured to generate a layout (such as a floor plan layout) of at least a portion of a premises to be monitored by the premises based system and populate the layout with at least one premises device. The processor may be further configured to cause layout data associated with the populated layout to be stored.

In one embodiment of this aspect, the layout may be populated with a plurality of premises devices based at least in part on a plurality of premises rules. The plurality of premises rules may dictate the type and location of the plurality of premises devices based on the layout. In another embodiment of this aspect, the layout may be populated with at least one of the plurality of premises devices based on a manual user selection of the at least one premises device. In another embodiment of this aspect, the layout may be populated with a plurality of premises devices corresponding to a plurality of service packages, each service package corresponding to at least one of a different number and different type of premises device than the other service packages.

In another embodiment of this aspect, at least one monitoring area of at least one premises device may be illustrated in the layout. In another embodiment of this aspect, the layout data may be stored for retrieval during installation of the premises based system. In another embodiment of this aspect, the layout data may indicate whether the layout was at least one of populated by applying the plurality of premises rules and by manual user selection of the at least one premises device. In another embodiment of this aspect, if the layout was populated by at least manual user selection, the processor may be further configured to apply the plurality of premises rules to the layout and determine the differences between the layout populated by at least manual user selection and the layout populated by applying the plurality of premises rules. The processor may be further configured to store the determined differences in the layout data.

In another embodiment of this aspect, the layout is generated based at least on one of captured images of the at least the portion of the premises to be monitored, a predefined floor layout template and manual user interaction with a drawing tool. In one embodiment of this aspect, the at least one premises device may include at least one of a smoke detector, glass break sensor, camera, door contact sensor, window contact sensor, carbon monoxide (CO) detector and motion detector.

According to another embodiment, a system for a premises based system is provided. An apparatus includes a first processor is configured to generate a layout of at least a portion of a premises to be monitored by the premises based system and populate the layout with at least one premises device. The first processor may be configured to cause layout data associated with the populated layout to be stored, the layout data including configuration data for each of the at least one premises devices. A control unit. The control unit may include a first communication interface configured to receive the configuration data of at least one premises device. The control unit may include a second processor configured to register and configure the at least one premises device based at least in part on the received configuration data.

In one embodiment of this aspect, the layout may be populated with a plurality of premises devices corresponding to a plurality of service packages, each service package corresponding to at least one of a different number and different type of premises device than the other service packages. In another embodiment of this aspect, at least one monitoring area of at least one premises device may be illustrated in the layout. In another embodiment of this aspect, the at least one premises device may include at least one of a smoke detector, glass break sensor, camera, door contact sensor, window contact sensor, carbon monoxide (CO) sensor and motion detector. In another embodiment of this aspect, the layout may be populated with a plurality of premises devices based at least in part on a plurality of premises rules. The plurality of premises rules dictate the type and location of at least one of the plurality of premises devices based on the layout.

In another embodiment of this aspect, the layout may be populated with at least one of the plurality of premises devices based on a manual user selection of the at least one premises device. In another embodiment of this aspect, if the layout was populated by at least manual user selection, the second processor may be configured to apply the plurality of premises rules to the layout, determine the differences between the layout populated by at least manual user selection and the layout populated by applying the plurality of premises rules and store the determined differences in the layout data. In another embodiment of this aspect, the layout data may be stored for further retrieval during installation of the premises based system. In another embodiment of this aspect, the layout data indicates whether the layout was at least one of populated by applying the plurality of premises rules and by manual user selection of the at least one premises device. In another embodiment of this aspect, the layout may be generated based at least on one of captured images of the at least the portion of the premises to be monitored, a predefined layout template and manual user interaction with a drawing tool. In another embodiment of this aspect, the control unit allows modification of the populated layout received and the first communication interface configured to transmit the modified version of the populated layout for future retrieval. In another embodiment of this aspect, the layout data indicates whether the layout was at least one of populated by applying the plurality of premises rules and by manual user selection of the at least one premises device.

According to another embodiment, a method for a premises based system is provided. A layout of at least a portion of a premises to be monitored by the premises based system may be generated. The layout is populated with at least one premises device. Layout data associated with the populated layout may be caused to be stored. In another embodiment of this aspect, the layout may be populated with a plurality of premises devices based at least in part on a plurality of premises rules. The plurality of premises rules dictate the type and location of at least one of the plurality of premises devices based on the layout. In another embodiment of this aspect, the layout may be populated with at least one of the plurality of premises devices based on a manual user selection of the at least one premises device.

In another embodiment of this aspect, the layout data may indicate whether the layout was at least one of populated by applying the plurality of premises rules and by manual user selection of the at least one premises device. If the layout was populated by at least manual user selection, the processor is configured to apply the plurality of premises rules to the layout, determine the differences between the layout populated by at least manual user selection and the layout populated by applying the plurality of premises rules and store the determined differences in the layout data. In another embodiment of this aspect, the layout is populated with a plurality of premises devices corresponding to a plurality of service packages, each service package corresponding to at least one of a different number and different type of premises device than the other service packages. In another embodiment of this aspect, at least one monitoring area of at least one premises device is illustrated in the layout.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein:

FIG. 14 is an exemplary order confirmation prompt with order summary in accordance with the principles of the invention.

DETAILED DESCRIPTION OF THE INVENTION

Figure 1:
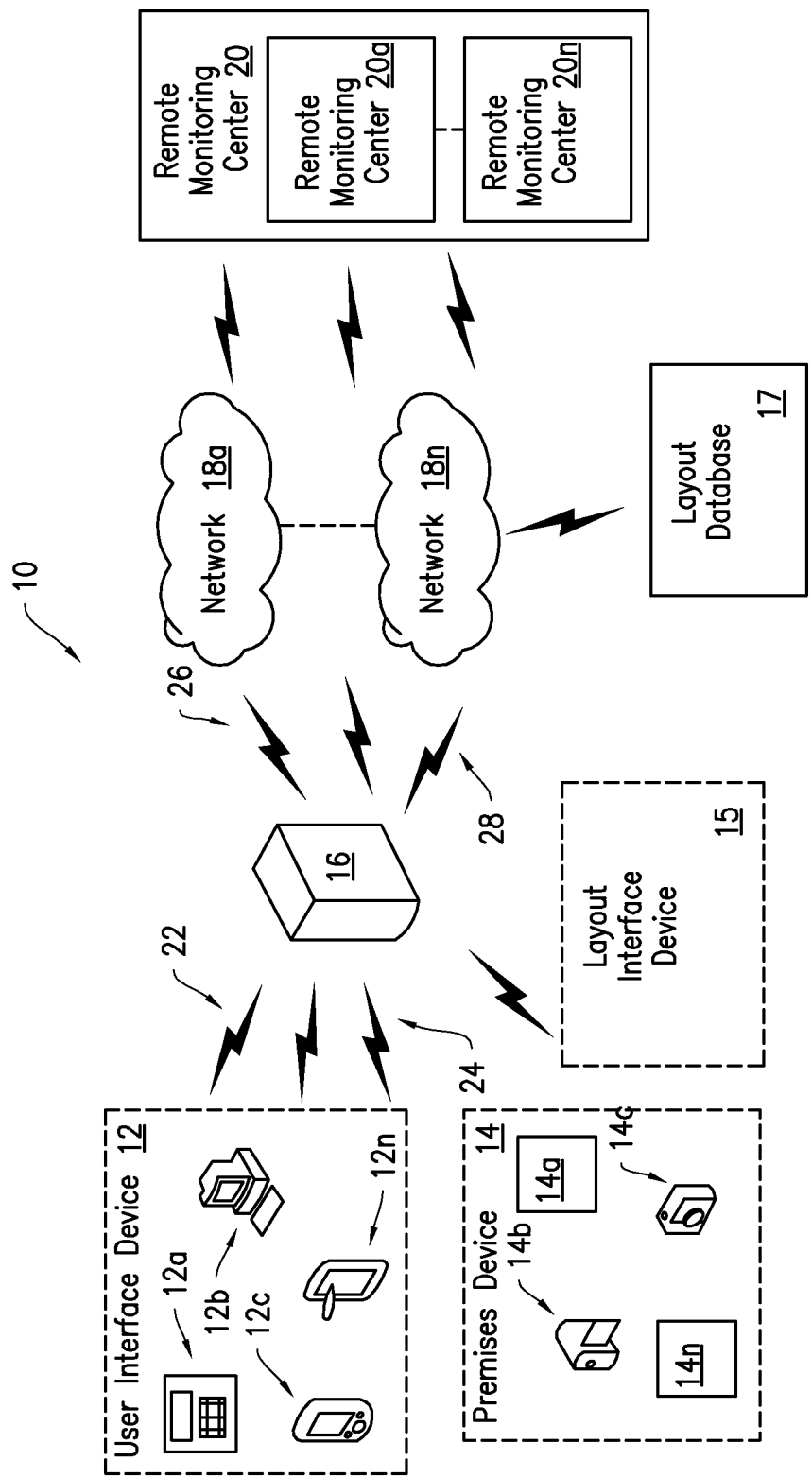
FIG. 1 is a block diagram of a premises-based system for premises-based control and management of devices, constructed in accordance with the principles of the invention.

The invention advantageously provides a system, device and method for a security control management. Accordingly, the system, device and method components have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein. While the invention is described herein with respect to a security system, the invention is not limited to such. It is contemplated that the processes and functions described herein may be applied to any premises based system that centrally controls a plurality of separate devices.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements there is shown in FIG. 1 a security control system constructed in accordance with the principles of the invention and designated generally as "10." System 10 may include one or more user interface devices 12a to 12n (collectively referred to as "user interface device 12"), one or more premises devices 14a to 14n (collectively referred to as "premises device 14"), one or more layout interface devices 15 (collectively referred to as "layout interface device 15"), control unit 16, one or more networks 18a to 18n (collectively referred to as "network 18") and one or more remote monitoring centers 20a to 20n (collectively referred to as "remote monitoring center 20"), communicating with each other.

User interface device 12 may be a wireless device that allows a user to communicate with control unit 16. User interface device 12 may be a portable control keypad/interface 12a, computer 12b, mobile phone 12c and tablet 12n, among other devices that allow a user to interface with control unit 16. User interface device 12 may communicate at least with control unit 16 using one or more wireless communication protocols well known to those of ordinary skill in the art. For example, portable control keypad 12a may communicate with control unit 16 via a ZIGBEE based communication link 22, e.g., network based on Institute of Electrical and Electronics Engineers (IEEE) 802.15.4 protocols, and/or Z-wave based communication link 24, or over the premises' local area network, e.g., network based on Institute of Electrical and Electronics Engineers (IEEE) 802.11 protocols. User interface device 12 is discussed in detail with respect to FIG. 3.

Premises devices 14 may include one or more types of sensors, control and/or image capture devices for monitoring a premises. For example, the types of sensors may include various life safety related sensors such as motion sensors, fire sensors, smoke sensor, glass break sensor, camera, motion sensor, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with control unit 16 via proprietary wireless communication protocols and may also use Wi-Fi, both of which are known in the art. Those of ordinary skill in the art will also appreciate that various additional sensors and control and/or image capture devices may relate to life safety or life style depending on both what the sensors, control and image capture devices do and how these sensors, control and image devices are used by system 10. One of the advantages of the invention is the ability to use any of these devices irrespective of whether they are life safety or life style.

Layout interface device 15 may communicate with user interface device 12, control unit 16, layout database 17, network 18 and remote monitoring center 20. Layout interface device 15 may be a mobile phone, tablet, computer, laptop computer and personal digital assistant device, among other devices that allow a consumer, salesperson and/or installer to generate and/or modify a populated layout such a floor plan layout, as discussed in detail with respect to FIGS. 8-13. Control unit 16 may provide management functions such as power management, premises device management and alarm management, among other security and home automation functions. In particular, control unit 16 may manage one or more life safety and life style features. Life safety features may correspond to premises based system functions and settings associated with premises conditions that may result in life threatening harm to a person such as carbon monoxide detection and intrusion detection. Life style features may correspond to premises based system functions and settings associated with video capturing devices and non-life threatening conditions of the premises such as lighting and thermostat functions. Exemplary control unit 16 components and functions are described detail with respect to FIG. 2.

Layout database 17 may include layout data associated with one or more premises and/or customers. For example, the layout data may include layouts, dimensions of premises, room labels of premises, layout of service packages within a respective layout, premises device configuration data, number of premises devices 14, type of premises devices, location, e.g., global position system coordinates, XYZ coordinates, etc. of one or more premises devices 14 and monitoring area of one or more premises devices 14, among other data associated with the one or more premises to be monitored by a premises based system. The layout database may be located in network 18 or remote monitoring center 20, among other places that allow layout database 17 to communicate with user interface device 12, layout interface device 15, control unit 16, network 18 and/or remote monitoring center 20, among other devices and/or servers.

Control unit 16 may communicate with network 18 via one or more communication links. In particular, the communications links may be broadband communication links such as a wired cable modem or Ethernet communication link 26, and digital cellular communication link 28, e.g., long term evolution (LTE) based link, among other broadband communication links known in the art. Broadband as used herein may refer to a communication link other than a plain old telephone service (POTS) line. Ethernet communication link 26 may be an IEEE 802.3 based communication link. Network 18 may be a wide area network, local area network, wireless local network and metropolitan area network, among other networks known in the art. Network 18 provides communications between control unit 16 and remote monitoring center 20.

System 10 may include remote monitoring center 20 that is capable of performing monitoring, configuration and/or control functions associated with control unit 16. For example, remote monitoring center 20 may include a remote life safety monitoring center that monitors life safety features associated with control unit 16 in which the remote monitoring center 20 receives life safety data from control unit 16. For example, with respect to fire and carbon monoxide detectors/sensors, life safety data may include at least one carbon monoxide readings, smoke detection reading, sensor location and time of reading, among other related to these detectors that may be communicated with remote monitoring center 20. In yet another example, with respect to a door contact detector, life safety data may include at least one of sensor location and time of detection, among other data related to the door contact detection that may be communicated with remote monitoring center 20.

Alarm event data from the premises may be used by the remote monitoring center in running through various life safety response processes in notifying the owner of the premises, determining whether an actual alarm event is occurring at the premises, and notifying any appropriate response agency (e.g., police, fire, emergency response).

The same or separate remote monitoring center 20 may also include a life style system/service that allows for various life style features associated with security control 16. The remote life style system may receive life style data from control unit 16. For example, with respect to temperature control, life style data may include thermostat readings. In yet another example, with respect to video capture devices, life style data may include at least one of captured images, video, time of video capture and video location, among other data related to video capture devices that may be communicate with remote monitoring center 20. Remote monitoring center 20 may also provide updates to control unit 16 such as updates to features associated with life safety and/or life style operating system. Those of ordinary skill in the art will appreciate that video and other data may also be used by the life safety monitoring center.

Figure 2:
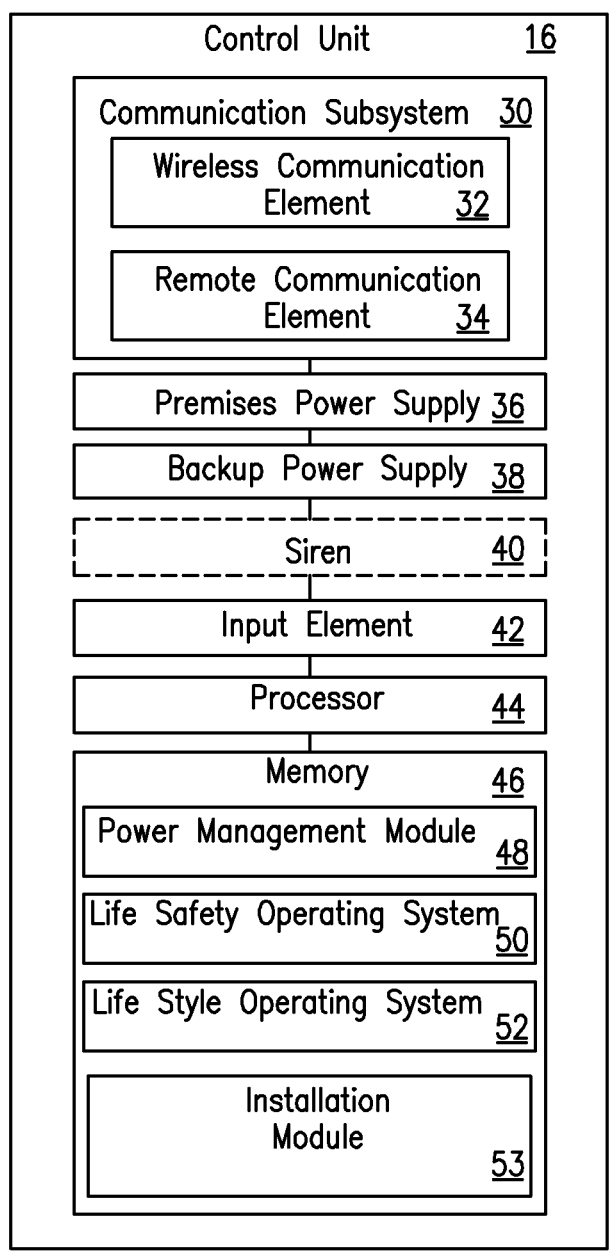
FIG. 2 is a block diagram of control unit constructed in accordance with the principles of the invention.

An exemplary control unit 16 for managing a premises based system is described with reference to FIG. 2. Control unit 16 may include communication subsystem 30 that is configured to provide communications with user interface device 12, premises device 14 and network 18. In particular, communication subsystem 30 may include wireless communication element 32 and remote communication element 34. Wireless communication element 32 provides wireless communication with user interface device 12 and premises device 14. Wireless communication element 32 may support one or more wireless communication protocols such as ZIGBEE, Z-wave and Wi-Fi, e.g., IEEE 802.11, among others wireless communications protocols that support wireless data transfer.

Wireless communication element 32 may be composed of one or more hardware components in which each hardware component is configured to provide wireless communication using a specific protocol. For example, wireless communication element 32 may include a ZIGBEE hardware component configured to provide ZIGBEE based communications and a Z-wave hardware component configured to provide Z-wave based communications. The hardware components associated with wireless communication element 32 may be internal components within control unit 16 such that these features are built-in or standard features. Alternatively, any one or more of the hardware components associated with wireless communication element 32 may be external components that may be replaced by a user, homeowner or installer. For example, the ZIGBEE and Z-wave hardware component modules may be internal components while the Wi-Fi hardware component may be an external component that allows for upgrading. Wireless communication element 32 may broadcast a wireless signal so that user interface device 12 may connect directly to control unit 16. For example, wireless communication element 32 may provide a Wi-Fi encrypted service set identifier (SSID) and path for communication with multiple user interface devices 12.

By supporting a plurality of wireless communication protocols, wireless communication element 32 enables control unit 16 to be used with a variety of user interface devices 12 and premises devices 12 that are designed to work using only a specific wireless communication protocol. Supporting a plurality of wireless communication protocols allows easy upgrading of existing user interface device 12 and premises device 14, and for control unit 16 integration with various equipment venders that may incorporate different wireless protocols. Wireless communication element 32 may provide two-way voice communication with user interface device 12, which is then communicated with remote monitoring center 20. For example, wireless communication element 32 may support voice over internet protocol (VoIP) based communications. In one embodiment, component parts of wireless communication element 32, e.g., an IEEE 802.11 communication module, may also be past of remote communication element so that the wireless communication protocols, e.g., IEEE 802.11 protocols, can be used to communicate with remote monitoring center 20. In other words, one or more specific communication modules of wireless communication element 32 can also be part of remote communication element 34.

Remote communication element 34 is configured to provide broadband communications with remote monitoring center 20 via network 18. For example, remote communication element 34 may be an Ethernet based hardware component that provides communication with network 18. Alternatively or in addition to Ethernet based hardware component, remote communication element 34 may include a Wi-Fi (IEEE 802.11) hardware component that provides communication with a home or other premises network, e.g., a home wireless network, and may utilize some of the same components as wireless communication element 32. The remote communication element 34 may also include a cellular radio hardware component that provides communications with at least one cellular network such as an LTE based cellular network. Control unit 16 may use Ethernet communication link 26 as a primary communication link such that the cellular communication link is used for broadband communications when the Ethernet or primary communication link is not functioning properly such as during a power outage where a home network is unavailable, i.e., home network router has no power.

Control unit 16 may include premises power supply 36 that is configured to provide power to control unit 16. For example, premises power supply 36 may provide power to control unit 16 via a home alternating current (AC) power outlet or other power outlets that are known in the art. Premises power supply 36 may be a primary power supply such that control unit 16 operates using power from the premises power supply 36 when available. Control unit 16 may also include back-up power supply 38 that provides power during premises power supply failure. Back-up power supply 38 may include one or more disposable or rechargeable batteries that are configured to provide enough power to operate control unit 16 for first predetermined amount of time and activate siren 40 for a second predetermined amount of time, e.g., a user can access the premises based system for at least twenty-four hours while control unit 16 is powered by back-up power supply 38 while the siren can be activated and operate after the twenty-four hour period.

Siren 40 may be an eighty-five decibel (dB) siren, among other audible devices known in the art. Siren 40 may be an optional component in control unit 16 such that audible alerts are generated by user interface device 12, e.g., portable control keypad/interface 12a, and not control unit 16. Moreover, control unit 16 may include at least one universal serial bus port (USB) to receive power from a laptop or other device with a USB interface. Other port types capable of providing power to control unit 16 may be used based on design need.

Input element 42 may be configured to receive input data from a user. For example, input element 42 may be a ten number keypad that enables a user to arm and disarm system 10. Input element 42 allows for an alternative or back-up way of arming and disarming system when no user interface device 12 is available to a user. Other input elements may be used as are known in the art. Control unit 16 may include one or more indicators such as light emitting diodes (LEDs) that may indicate the status of control unit 16. For example, a first LED is turned on when security control panel is powered, a second LED is turned on when the system is armed or disarmed, a third LED is turned on when an internet protocol connection is connected, a fourth LED may be turned on when the cellular connection has sufficient strength and the first LED may flash during low power conditions, among other LED and LED on/off may be used based on design need. Processor 44 may be a central processing unit (CPU) that executes computer program instructions stored in memory 46 to perform the functions described herein.

Memory 46 may include non-volatile and volatile memory. For example, non-volatile memory may include a hard drive, memory stick, flash memory and the like. Also, volatile memory may include random access memory and others known in the art. Memory 46 may store at least one of power management module 48, life safety operating system 50, life style operating system 52 and installation module 53, among other data and/or modules. Power management module 48 includes instructions, which when executed by processor 44, causes processor 44 to perform the process described herein, such as the power management process, discussed in detail with reference to FIG. 5. Life safety operating system is configured to provide life safety features associated with system 10. Life style operating system 52 is configured to provide life style features associated with system 10. In particular, processor 44 is configured to run both life safety operating system 50 and life style operating system 52 such that separate processors are not needed to run both operating systems. This single processor configuration reduces cost while still providing both life safety and life style features. Installation module 53 is configured to cause control unit 16 to configure the one or more premises devices based at least in part on a populated layout data, as discussed in detail with respect to FIG. 9.

Memory 46 may include a Wi-Fi high-jacking module (not shown) that varies control unit 16 settings when processor determines an unauthorized connection to control unit 16 via Wi-Fi. For example, Wi-Fi high-jacking module may shutdown Wi-Fi and/or move to low power RF such that user interface device 12 and/or premises device 14 can still communicate with security control panel. Memory 46 may include an auto enrollment module (not shown) that is configured to cause processor 44 to search, wirelessly, for user interface device 12 and premises device 14 located within or near the premises. The auto enrollment module may cause processor 44 to forward information associated with the found devices 12 and 14 to remote monitoring center 20 such that remote monitoring center 20 may push enrollment data to control unit 16 to facilitate configuration. Control unit 16 may use the enrollment data configured the premises based system such that the system operates using the found devices 12 and/14. Auto enrollment module reduces installation time as the devices 12 and/14 are automatically found and enrolled for use by control unit 16. The auto enrollment module may be part of installation module 53.

Figure 3:
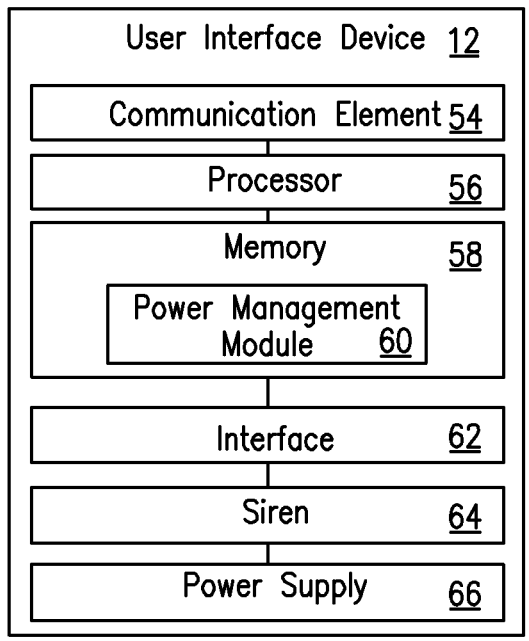
FIG. 3 is a block diagram of a user interface device constructed in accordance with the principles of the invention.

An exemplary user interface device 12 for providing local control and configuration data is described with reference to FIG. 3. User interface device 12 may include a portable control keypad/interface 12a, personal computer 12b, mobile device 12c and tablet computer 12n, among other devices. User interface device 12 includes communication element 54 that is configured to communicate with control unit 16 via at least one wireless communication protocol such as ZIGBEE, Z-wave and Wi-Fi, among other protocols known in the art. User interface device 12 may include processor 56 and memory 58 that correspond to control unit 16 components, with size and performance being adjusted based on design need. Processor 56 performs the functions described herein with respect to user interface device 12.

Figure 6:
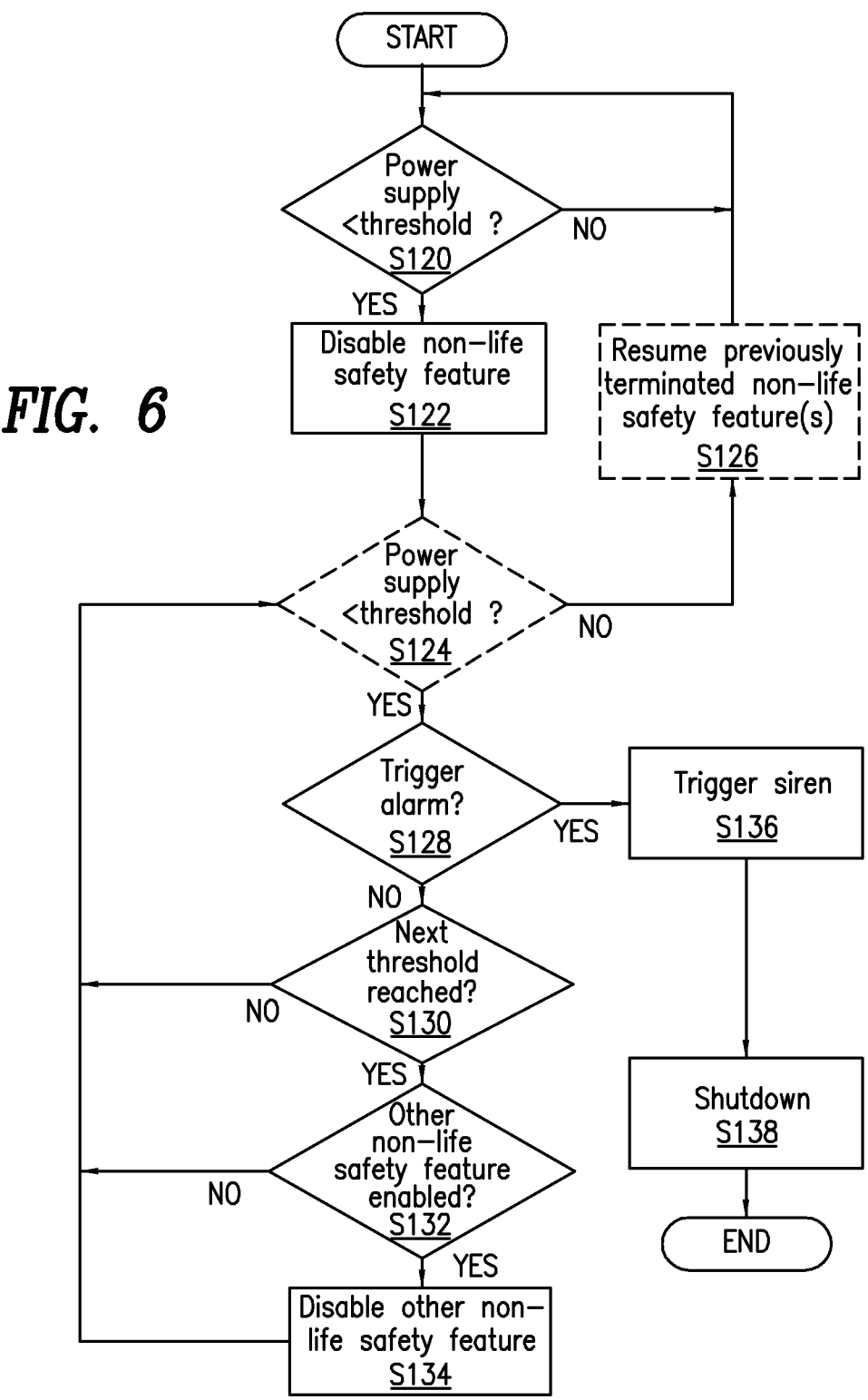
FIG. 6 is a flow chart of an exemplary user interface device power management process of the invention, constructed in accordance with the principles of the invention.

Memory 58 may include power management module 60 in which power management module 60 includes instructions, which when executed by processor 56, causes processor 56 to perform the process described herein, such as the power management process, discussed with respect to FIG. 6. Memory 58 may store other modules and data based on design need. Interface 62 may be user interface configured to receive user inputs. For example, interface 62 may receive local control and configuration data input from user.

User interface device 12 may include siren 64 such as an eighty-five dB siren or other audible device(s) known in the art. User interface device 12 may include power supply 66 for supplying power to user interface device 12. Power supply 66 may include one or more rechargeable and/or disposable batteries, among other types of batteries that are well known in the art. Moreover, user interface device 12 may be powered via a universal serial bus (USB), have an interface that allows the connection of an external power adapter/recharger, and/or other connection type.

Figure 4:
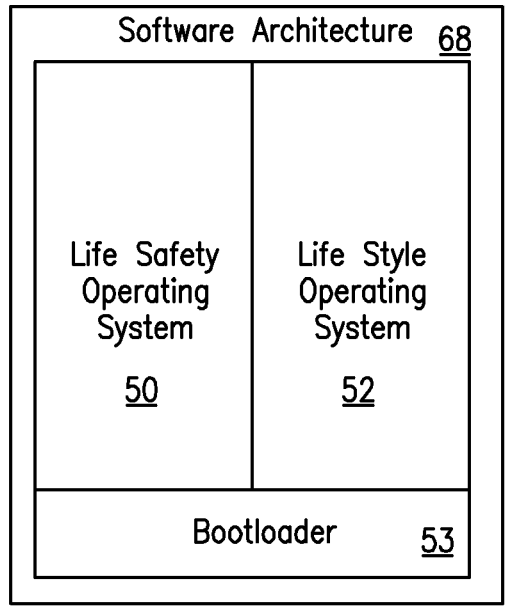
FIG. 4 is a block diagram of a software architecture of the control unit, constructed in accordance with the principles of the invention.

Exemplary software architecture 68 of control unit 16 is described with reference to FIG. 4. In particular, software architecture 68 may include life safety operating system 50, life style operating system 52 and bootloader 53, among other software components relates to security feature management and operation of control unit 16. Life safety operating system 50 and life style operating system 52 are configured to run in control unit 16 in which the life safety operating system 50 and life style operating system 52 run in a virtual machine configuration. The virtual machine configuration allows a single processor such as processor 44 to separately run the life safety operating system 50 while updating life style operating 52 without negatively affecting features associated with life safety operating system 50, i.e., life safety features remain functioning while life style features are updated. The converse is also contemplated. Bootloader 53 is used to load the run time environment for operating systems 50 and 52.

Figure 5:
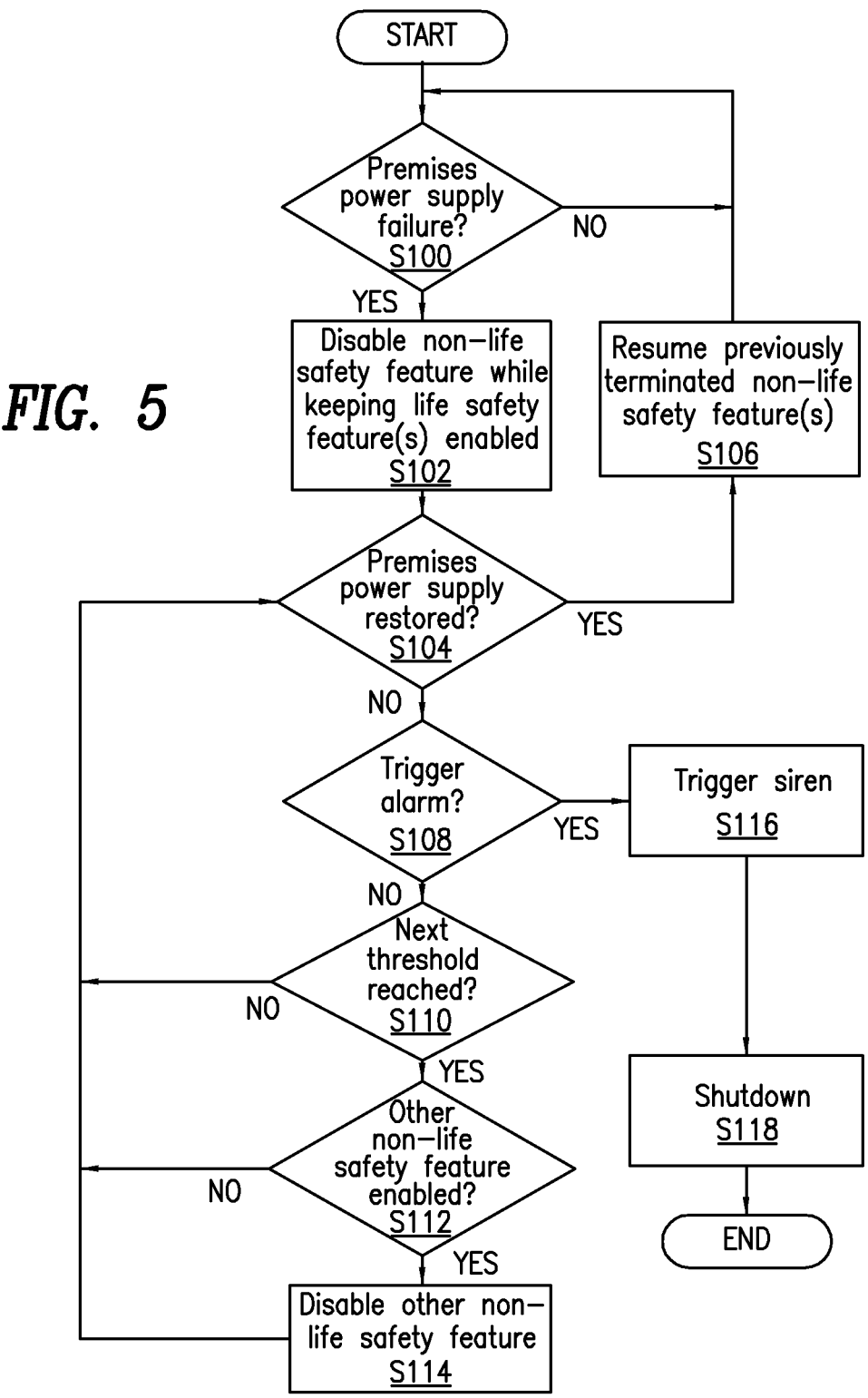
FIG. 5 is a flow chart of an exemplary control unit power management process of the invention, constructed in accordance with the principles of the invention.

An exemplary power management process is illustrated in FIG. 5. The power management process relates to managing a premises based system based at least in part on the monitoring of premises power supply 36 and back-up power supply 38. Processor 44 determines whether premises power supply 36 has failed (Block S100). For example, processor 44 may monitor the power being provided by premises power supply 36 using well known methods in the art to determine whether power failure has occurred. Power failure may occur when the voltage being supplied by premises power supply 36 falls below a predefined voltage threshold. If processor 44 determines a power failure has not occurred, the determination of Block S100 may be repeated.

If the determination is made that premises power supply 36 is in a power failure condition, processor 44 disables a non-life safety feature such as a life style feature, while keeping the life safety feature(s) enabled (Block S102). For example, the temperature control feature associated with the life style operating system may be disabled while keeping the intrusion detection, fire detection and carbon monoxide detection features associated with life safety operating system 50 enabled. Power management module 48 advantageously allows non-life safety features such as life style features associated with life style operating system 52 to be disabled without interrupting life safety features associated with life safety operating system 50. This configuration helps ensure life safety features will remain enabled during premises power supply 36 failure while at the same time reducing power consumed by disabling a non-life style feature. For example, some life style features may require or attempt to initiate communication with user interface device 12 and/or remote monitoring center 20 in which such communications consume power, i.e., may consume limited back-up power. Other non-life style features that may be disabled include turning off any security control device LEDs and/or terminating communications to user interface device 12 while maintaining communications with premises devices. Therefore, disabling at least one non-life safety feature reduces the amount of power consumed by control unit 16 in which the more non-life safety features that are disabled, the greater the power savings.

Processor 44 determines whether premises power supply 36 has been restored based at least in part on the monitoring of premises power supply 36 (Block S104). For example, processor 44 may continually or periodically monitor the power level of premises power supply 36 to determine whether the power level is equal to or above the predetermined voltage threshold. If processor 44 determines premises power supply 36 has been restored, processor 44 may resume or enable the previously disabled non-life safety feature(s) (Block S106). In other words, the power management process enables non-life safety features such as life style features that may consume more power once security control device 16 is being power by premises power supply 36 such that the non-life safety features consume minimal power from the back-up power supply 38.

If the determination is made that power of premises power supply 36 has not been restored, a determination is made whether to trigger an alarm such as an audible alarm (Block S108). In particular, an audible alarm may be trigger after processor 44 determines control unit 16 has been operating on back-up power supply 38 for a predetermined amount of time, e.g., twenty-four hours. The predetermined amount of time may be based on design need and/or regulatory requirements. If the determination is made to trigger an alarm, siren 40 or siren 64 may be triggered for a predetermined amount of time (Block S116). In one embodiment, processor 44 uses communication subsystem 30 to send a siren trigger message to user interface device 12 to trigger siren 64 in user interface device 12. For example, siren 64 may be triggered for at least four minutes in order to alert a user of a control unit 16 status such as loss of all power. The predetermined amount of time the alarm is triggered may be based on design need and/or regulatory requirements. Other criteria may be used to trigger an audible alarm based on design need. After triggering siren 64, control unit 16 may shut down (Block S118). For example, control unit 16 may perform a graceful shutdown according to a shutdown routine when the back-up power supply 38 reaches a predefined threshold such as ten percent power remaining.

Referring back to Block S108, if processor 44 makes the determination not to trigger an alarm, processor 44 determines whether an available power threshold has been reached (Block S110). The power threshold may correspond to a back-up power supply 38 level at which another non-life safety feature may be shutdown in order to reduce power consumption. For example, a different non-life safety feature may be terminated every time the power level falls by a predetermined amount such as five or ten percent or to a predetermined level. Moreover, one or more non-life safety features may be terminated at a time. If the determination is made that the feature threshold is not reached, the determination of Block S104 may be repeated.

If the determination is made that the power threshold has been reached, processor 44 determines whether at least one other non-life safety feature, e.g., life style feature, is enabled (Block S112). For example, a lighting life style feature may have been previously been disabled in Block S102 but a temperature life style feature remains enabled. If the determination is made that at least one other non-life safety feature is not enabled, the determination of Block S104 may be repeated. If processor 44 determines at least one other non-life safety feature is enabled, processor 44 disables the at least one other non-life safety feature such that the non-life safety features consume less power from the back-up power supply 38 (Block S114). The order of which non-life safety features are disabled may vary based on design need and power consumption of individual features or other criteria. After disabling the at least one other non-life safety feature, the determination of Block S104 may be repeated. The power management process helps ensure more important or safety-dependent features stay powered by terminating or disabling less important features such as life style features. Alternatively, processor 44 may disable more than one or all non-life safety features at one time.

An exemplary power management process for user interface device 12 is illustrated in FIG. 6. The power management process relates to managing user interface device 12 features based at least in part on the monitoring of power supply 66. For example, processor 56 may monitor the power being provided by power supply 66 using well known methods in the art. Processor 56 determines whether the power being supplied by power supply 66 drops below a predefined threshold based at least in part on the monitoring, i.e., whether a power supply 66 voltage or power level is less than a threshold (Block S120). The threshold may be a power and/or voltage level determined based on design need and/or other factors. If processor 56 determines power supply 66 is not below, i.e., greater than or equal to, a predetermined threshold, the determination of Block S120 may be repeated.

If the determination is made that the power supply 66 is below the predetermined threshold, processor 56 disables at least one non-safety feature while keeping life safety feature(s) enabled at user interface device 12 (Block S122). For example, processor 56 may disable a life style feature such that less power may be consumed by not having to perform processing, communication and/or other functions associated with the disabled feature. Other non-safety features may include a backlight keypad and/or display feature. Therefore, disabling at least one non-life safety feature reduces the amount of power consumed by user interface device 12 such that the more non-safety features that are disabled, the greater the power savings.

After at least one non-life safety has been disabled, processor 56 may determine whether power supply 66 is still below the threshold based at least in part on the monitoring (Block S124). For example, processor 56 may continually or periodically monitor the voltage level of power supply 66. If the determination is made that power supply 66 is not below the threshold (i.e., is greater than or equal to the threshold), processor 56 may resume the previously disabled or terminated non-safety feature(s) (Block S126). In other words, the power management process of FIG. 6 enables or executes the previously disabled non-life safety feature(s) that may consume more power once power supply 66 is greater than or equal to the threshold such that the non-life safety features consume minimal power from power supply 66. Power supply 66 may rise back to the predetermined threshold level when power supply 66 is being recharged and/or when user interface device 12 is being power via USB, among other situations where power supply 66 is no longer below the predetermined threshold. Alternatively, Blocks S124 and S126 may be skipped or excluded from the power management process of FIG. 6 based on design need, i.e., the process moves from Block S122 directly to Block S128.

If the determination is made that power supply 66 is below threshold, processor 56 determines whether to trigger an alarm such as an audible alarm (Block S128). In particular, an audible alarm may be trigger after processor 56 determines power supply 66 has reached a lower predetermined threshold. For example, the lower predetermined threshold may correspond to a minimum power level needed to trigger siren 64 for a predetermined amount of time and/or shutdown user interface device 12. The lower predetermined threshold may be based on design need. If the determination is made to trigger an alarm, siren 64 and/or siren 40 may be triggered for a predetermined amount of time (Block S136). For example, siren 64 may be triggered for at least four minutes in order to alert a user of user interface device 12 status such as a loss of all power status. The predetermined amount of time the alarm is triggered may be based on design need and/or regulatory requirements. Other criteria may be used to trigger an audible alarm based on design need. After triggering siren 64, user interface device 12 may shut down (Block S138). For example, control unit 16 may perform a graceful shutdown according to a shutdown routine.

Referring back to Block S128, if the determination is made not to trigger an alarm, processor 56 determines whether a feature threshold has been reached (Block S130). The feature threshold may correspond to a back-up power supply 38 level at which another feature may be shutdown in order to reduce power consumption. For example, a difference feature may be terminated every time the power level fails another predetermined amount, e.g., five or ten percent. Moreover, more than one feature may be disabled or terminated at a time. If the determination is made that the feature threshold is not reached, the determination of Step S124 may be repeated. Alternatively, if Block S124 is skipped or excluded from the process and the determination is made that the feature threshold not been reached, the determination of Block S128 may be performed.

If the determination is made that the feature threshold is reach, processor 56 determines whether at least one other non-life safety feature is enabled (Block S132). If the determination is made that at least one other non-life safety feature is not enabled, the determination of Block S124 may be repeated. Alternatively, if Block S124 is skipped or excluded from the process and the determination is made that at least one other non-life-safety feature is not enabled, the determination of Block S128 may be repeated, i.e., the process moves from Block S132 to Block S128. If processor 56 determines at least one other non-life safety feature is enabled, processor 56 disables the at least one other life style feature such that the non-life safety features consume less power from power supply 66 (Block S134). The order of which non-life safety features are disabled may vary based on design need and power consumption of individual features or other criteria.

After disabling the at least one other non-life safety feature, the determination of Block S124 may be repeated. Alternatively, if Block S124 is skipped or excluded from the process and the other non-life safety feature has been disabled at Block S134, the determination of Block S128 may be repeated, i.e., the process moves from Block S134 to Block S128. The power management process helps ensure more important or safety dependent features remain operating by terminating or disabling less important features such as life style features or other non-safety features at user interface device 12. Alternatively, processor 56 may disable more than one or all life style features at one time. In one embodiment, the power management is configured and power supply 66 sized such that processor 56 can still trigger and sound siren 64 for four minutes after a twenty-four hour period upon the occurrence of a triggering condition, e.g., low battery, sensor trigger detection, receipt of trigger message from control unit 16, etc.

Figure 7:
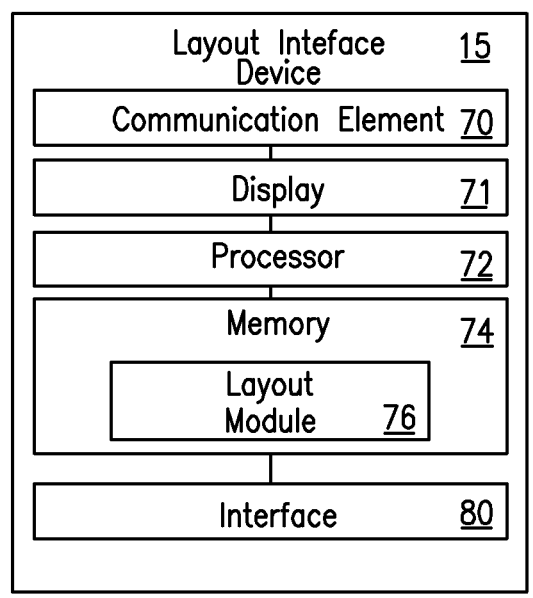
FIG. 7 is an exemplary block diagram of a layout interface device constructed in accordance with the principles of the invention.

An exemplary layout interface device 15 is described with reference to FIG. 7. Layout interface device 15 includes communication element/interface 70 for communicating with user interface device 12, control unit 16, network 18, layout database 17 and remote monitoring center 20 via one or more communication protocols and methods. Communication element 70 may include wireless communication element 32 and/or remote communication element 34 similar to communication subsystem 30. Display 71 may be a liquid crystal display or light emitting diode (LED) display, among other type of electronic displays known in the art. Display 71 is configured to display layouts, premises device 14 location and/or details, monitoring areas of premises devices 14, premises dimensions and/or service packages, among other data that may be received from layout database 17 and/or associated with the premises. Processor 72, memory 74 and interface 80 function substantially the same as similar components of user interface device 12 with size and performance being adjusted based on design need.

Memory 74 includes layout module 76. Layout module 76 includes instructions, which when executed by processor 72, cause processor 72 to perform the process described herein, such as the layout process, discussed in detail with reference to FIG. 8. The layout process can be implemented by a consumer, installer and/or sales associate using user interface device 12, i.e., user interface device 12 may include layout module 76, or layout interface device 15.

Figure 8:
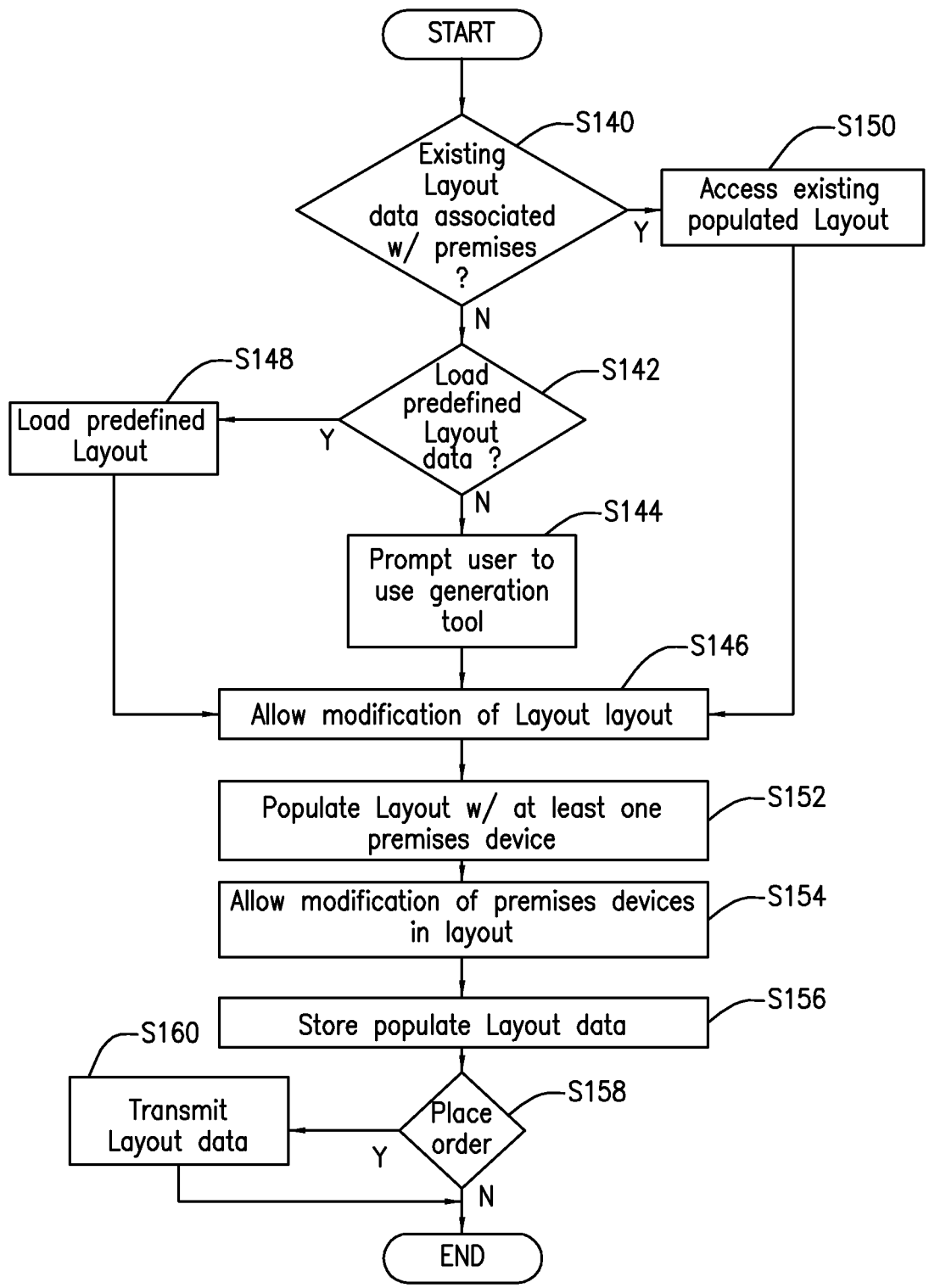
FIG. 8 is a flow chart of an exemplary layout process in accordance with the principles of the invention.

An exemplary layout process is illustrated in FIG. 8. The layout process relates to generating a layout-based model of the premises based system such as a system that is going to be installed in a premises before an installer goes to install the actual premises based system. In particular, the layout process may be performed by a sales person associated with the security company, a consumer and/or a user with or without access to the premises. Processor 72 determines whether there is an existing populated layout associated with a premises (Block S140). For example, processor 72 cause a request to be transmitted to layout database 17 for layout data associated with an existing populated layout associated with the premises or customer. The requested layout data may then be displayed via display 71. Alternatively, processor 72 checks memory 74 for stored layout data associated with an existing populated layout.

If processor 72 determines layout database 17 does not have an existing populated layout stored for the premise, processor 72 determines whether to access predefined layout data associated with a layout (Block S142). The predefined layout data may include established layout templates based on typical residences or business layouts, among other common layouts. If processor 72 determines not to access a predefined layout, processor 72 may prompt salesperson or consumer to generate a layout using a generation tool, i.e., generate a layout of at least a portion of a premises to be monitored by the premises based system (Block S144). For example, layout interface device 15 may prompt user to generate a layout by going to every room in the building where the premises based system is to be installed and uses the generation tool to map or determine dimensions of rooms in premises. The layout may be generated based at least on one of captured images of the at least the portion of the premises to be monitored, a predefined floor layout template and manual user interaction with a drawing tool.

In particular, the generation tool may use the digital camera (not shown) of layout interface device 15 to capture images for room mapping. Alternatively, the generation tool may be a separate device from layout interface device 15 that communicates dimension data of the premises to layout interface device 15 for layout generation. The generation tool may use other known methods for calculating the dimensions of a room of the premises based on one or more sensors. The generation tool may be a downloadable software application that estimates the dimensions of a room and composes a layout based on each mapped room. The layout may be displayed on display 17 during and/or after generation of the layout. After the salesperson or consumer has finished generating a layout using the generation tool, processor 72 allows modification of the layout (Block S146). For example, the user of layout interface device 15 may see the layout via display 71 and decide to modify the layout as needed in order to fix generation tool errors, to manually add rooms to layout, and/or correct calculated premises dimensions, among other reasons.

Referring back to Block S140, if processor 72 determines there is existing layout data associated with the premises and/or user, processor 72 causes the layout data to be accessed by layout interface device 15 for display on display 71. For example, layout interface device can download the layout data and/or can access the layout data stored in layout database 17 via a website interface. In one embodiment, layout database 17 may store a single version of a populated layout associated with consumer's building, home or premises such that storing multiple different versions of a populated layout is avoided, i.e., helps prevent the installation of the wrong populated layout. After processor 72 causes the layout to be accessed and displayed via display 71, processor 72 performs Block S146, as discussed above.

Referring back to Block S142, if processor determines to access a predefined layout data associated with a template layout, processor 72 causes one or more predefined layouts to be accessed and displayed on display 71. For example, the sales person and/or consumer may select via interface 80 from a plurality of layouts stored in layout database 17 that are similar to the consumer's layout. The plurality of layouts displayed to the consumer may be based on geographical location of the consumer. For example, homes the same geographical location, e.g., development or zip code, may have similar layouts such that one or more general layouts are predefined and stored in layout database 17 such that a user may use these layouts as a starting point for building a customized layout. Further, the predefined layouts may correspond to a customer such as a customer having multiple locations having substantially similar premises layouts. For example, a retail customer may have multiple locations in which the store layouts are designed to be substantially similar to one another can use a predefined layout that is customized for that customer.

Further, layout database 17 may store one or more predefined layouts, e.g., flow plan layouts, which are based on one or more layouts generated by other users. For example, once a predefined number of users in a specified geographical area generate a layout with at least one common layout feature, e.g., number of rooms, number of building stores, etc., the common layout features can be stored in layout database 17 as one or more layout templates that are accessible by a user via layout interface device 15. After accessing the one or more predefined layouts for display on display 71, processor performs the process of Block S146.

After processor 72 allows modification of the layout, processor 72 may automatically populate the layout with at least one premises device 14 (Block S152). Populating the layout may be based on a plurality of predefined premises rules, i.e., rules engine, stored in memory 74, database 17 and/or in another storage element in system 10. In other words, the layout is populated with a plurality of premises devices based at least in part on a plurality of premises rules in which the plurality of premises rules dictate the type and location of the plurality of premises devices based on the at least one characteristic of premises device 14 and/or layout. The at least one characteristic of premises device 14 may include device type, monitoring area and device function, among other determinable characteristics of premises device 14.

Each premises rule defines parameters that must be met in order to place at least one predefined premises device 14 within the layout. For example, a first rule may require that a window contact sensor be placed at every window. A second rule may require that a motion sensor be used to monitor window breaks instead of individual window contact sensors when more than three windows are place side by side, thereby possibly superseding the first premises rule. Another rule may require the layout of the premises to have at least one smoke detector and/or at least one carbon monoxide (CO) sensor. The plurality of premises rules may include other parameters that define specific locations to place one or more premises devices 14. For example, one premises rule may require at least one CO sensor to be placed in at least a bedroom and/or a garage. The parameters in each premises rule may be based on one or more of room dimensions, room type (e.g., bedroom, garage, baby room etc.), room floor, number of windows and/or nearby premises devices, among other parameters related to a premises.

Figure 12:
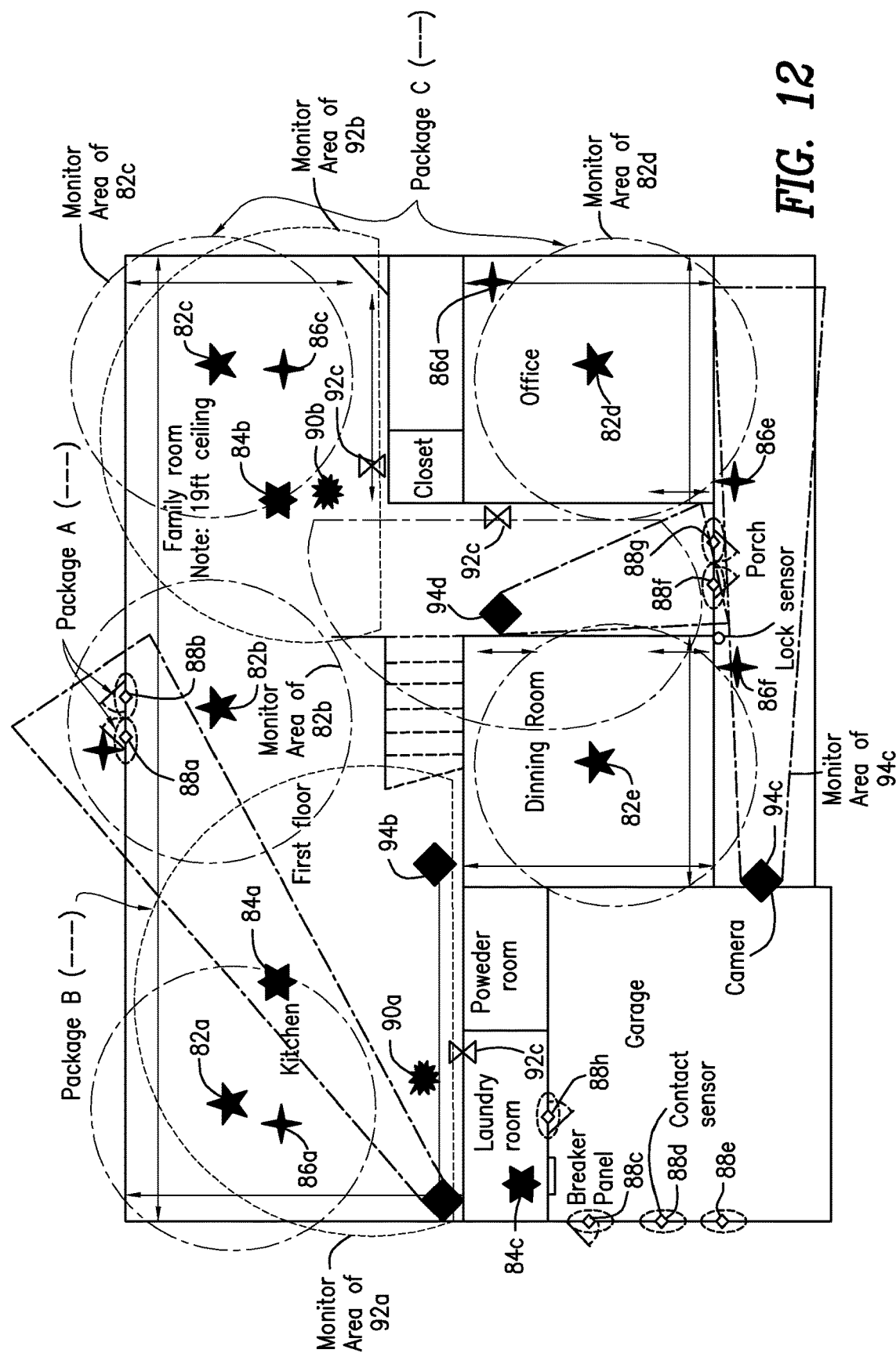
FIG. 12 is an exemplary populated layout with illustrated monitoring areas in accordance with the principles of the invention.

One or more of the premises rules may correspond to specific predefined service packages such as service package A, service package B and service package C, i.e., the layout may be populated with a plurality of premises devices corresponding to a plurality of service packages in which each service package corresponds to at least one of a different number and different type of premises device than the other service packages. For example, service package B may correspond to a predefined set of premises rules that cause layout illustrated in FIG. 12 to be populated with at least one premises device. Service package A may include the same set of premises rules as the gold package but may also include additional rules that cause at least one additional premises device to be populated in layout. For example, service package A may include at least one additional premises rule that requires all windows of the premises to be monitored via contact sensors, break sensors and/or motions sensors. Service package B may include the same set of premises rules as service package C but may also include additional premises rules that require at least one motion sensors. For example, service package B may require a motion sensor in the kitchen, family room and hallway to the porch, but not every room, as illustrated in FIG. 12. Layout database 17 and/or layout interface device may store other predefined service packages.

In another example, the premises rules may require that: every door is automatically populated in the layout with a lock, every room with a window is automatically populated with a corresponding glass break sensor and/or cameras are only populated in rooms having a minimum predefined dimension. The amount of premises devices 14 in the layout may be automatically tracked by processor 72.

Figure 13:
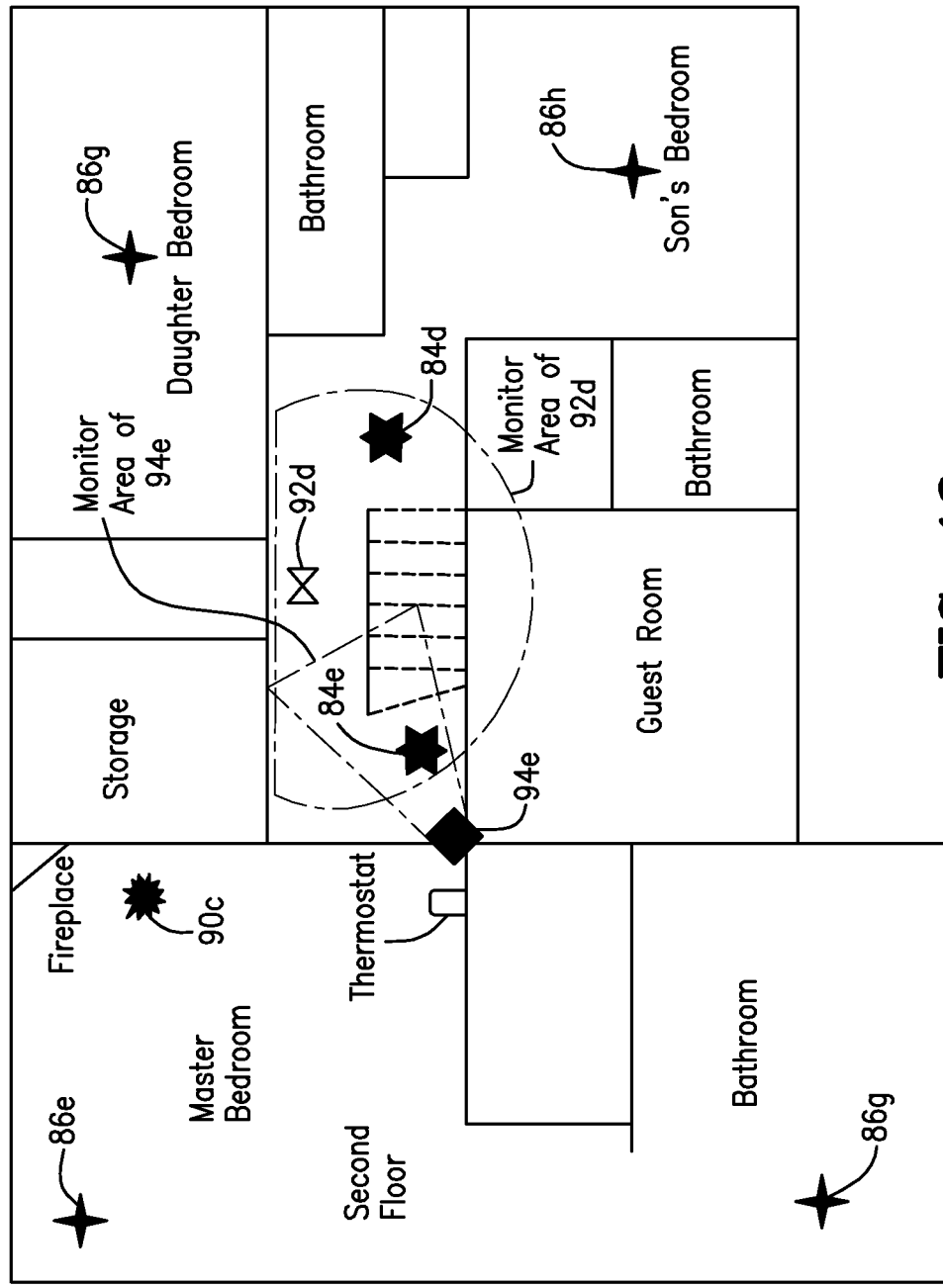
FIG. 13 is another exemplary populated layout with illustrated monitoring areas in accordance with the principles of the invention.

Alternatively or in addition to populating the layout based on premises rules, the layout may be manually populated by a user of layout interface device 15 and/or user with access to layout data in layout database 17, i.e., the layout is populated with at least one of the plurality of premises devices based on a manual user selection of the at least one premises device. A user may drag and drop an electronic representation of individual premises devices on layout interface device 15 such that the user is able to manually configure the layout by adding, removing and shifting one or more premises devices in the layout. The populated layout may also indicate the monitoring area of at least one premises device as illustrated in FIGS. 12-13, i.e., at least one monitoring area of at least one premises device is illustrated in the layout, thereby allowing the user to visualize the monitoring area of each sensor relative to the premises being monitored. The populated layout is displayed via display 71 such that the user is able to visualize the premises based system layout. Further, the monitoring area of one or more premises devices 14 may be displayed via display 71 such that the user is able to visualize portions of the premises that are covered and those that may not be covered, and the coverage areas of one or more service packages.

Once the layout has been populated with at least one premises device via automatic and/or manual population of at least one premises device, processor 72 allows the at least one premises device indicated in the populated layout to be modified (Block S154). For example, processor 72 allows the user to manually modify the layout displayed on display 71 that was populated based on at least one premises rule. The user is able to see, via display 71, how areas of the building or home that are being protected and by which sensors such that the user may modify placement and/or number of premises devices 14 to better fit the consumer's needs, e.g., the recommended package protects the porch and porch entrances but does not place any sensors in a closet that does not need protection FIG. 12. In another example, the user may be expecting an addition of a baby to the family; therefore, the user may manually place a camera and/or additional sensors to be placed in the baby's room via interface 80. In other words, the user is able to manually choose which additional sensors the user wants to add to the premises based system via the layout interface device 15. Likewise, the user can remove premises devices 14 via interface 80. Also, wall, building features and/or device icons may be dragged and dropped in interface 80 as needed, thereby simplifying populated layout customization.

After allowing modification of at least one premises device in the populated layout, the processor 72 causes the layout data associated with the populated layout to be stored in layout database 17 and/or layout interface device 15, i.e., the layout data is stored in the database for retrieval during installation of the premises based system (Block S156). The stored layout data may include layouts, dimensions of premises, room labels of premises, layout of service packages within a respective layout, number of premises devices 14, characteristics of premises devices, location, e.g., global position system coordinates, XYZ coordinates, etc., of one or more premises devices 14 and monitoring area of one or more premises devices 14, among other data associated with the one or more premises to be monitored by a premises based system.

Storage of the layout data allows for later retrieval of the layout by the user, premises based system associate and/or installer. The layout data may be stored in another device and/or server. The layout data may include an indication how the layout was generated, i.e., the layout data indicates whether the layout was at least one of populated by applying the plurality of premises rules and by manual user selection of the at least one premises device, such that the layout can be checked by the installer and/or automatically checked by the premises based system company if the layout was generated by the user. In other words, if the layout was populated by at least manual user selection, processor 72 may be configured to apply the plurality of premises rules to the layout, determine the differences between the layout populated by at least manual user selection and the layout populated by applying the plurality of premises rules, cause storage of the determined differences in the layout data. The layout data may include an indication whether the user modified and/or declined one or more predefined service packages. For example, the layout data may indicate the user modified or declined the recommended and/or platinum service packages.

This information in the layout data may be provided to the installer such that the installer can show the customer/user at the time of installation the gaps in the premises based system caused by the user's modification or rejection of the predefined service package, thereby providing another opportunity to up-sell service packages. Further, the layout data stored in layout database 17 may be updated every time the premises based system at the premises is updated after initial installation, thereby, tracking the user's and/or premises based system company's initiated changes to the premises based system at the premises. Tracking may include addition, removal and/or rearrangement of at least one premises device, among other changes that may be made to the premises based system at the premises.

This arrangement allows the security system company to offer specific upgrades or services based on tracked changes initiated by the user. Further, tracking the changes to the layout allows control unit 16, layout interface device 15 and/or remote monitoring center 20 to check and/or compare the current layout with a populated layout generated by one or more premises rules (service packages). Control unit 16, layout interface device 15 and/or remote monitoring center 20 may then suggest further modifications based on the application of the one or more premises rules (service packages).

Further, if the security system company offers a new product or service, the security system company may apply one or more premises rules specific to the new product or service to the installed layout for a customer in order to suggest where the new product or service may be added to the already installed premises based system. For example, if the new product is a sensor, the location and monitoring area of the sensor may be shown in the existing layout, thereby allowing a user to visualize how the added product and/or service will help further protect the premises.

Processor 72 determines whether to place an order to the premises based system based on an indication from the user of layout interface device 15 (Block S158). For example, the salesperson or consumer may be prompted via interface 80 to indicate whether to place the order for the premises based system based on the populated layout, e.g., an order button and order summary may be displayed via interface 80. Furthermore, the user of layout interface device 15 may view an order summary (FIG. 14) before, after or during layout modification of Blocks S146 and S154. If processor 72 determines to place the order due to an indication received via interface 80, processor 72 causes order details to be transmitted to the sales department in order to schedule an installer to come out to the property (Block S160). Further, the sale department may verify all the premises devices to be installed at the premises are in stock. If not, the sales department may proactively acquire more premises devices such that the installation at the premises is not delayed.

Furthermore, processor 72 may generate a contract based on the order summary such that the consumer can e-sign the contract. Furthermore, processor 72 may provide real-time availability of premises devices 14. If processor 72 determines not to place the order based on indications received from interface 80, the sales process may end. Furthermore, while layout module 76 is illustrated as being part of layout interface device 15, layout module 76 may be a downloadable software application that may be downloaded to other devices capable of communication with layout database 17 via network 18, such as user interface device 12. The layout interface device advantageously allows a user and/or consumer to visualize, modify and order a customized premises based system for a premises.

Figure 9:
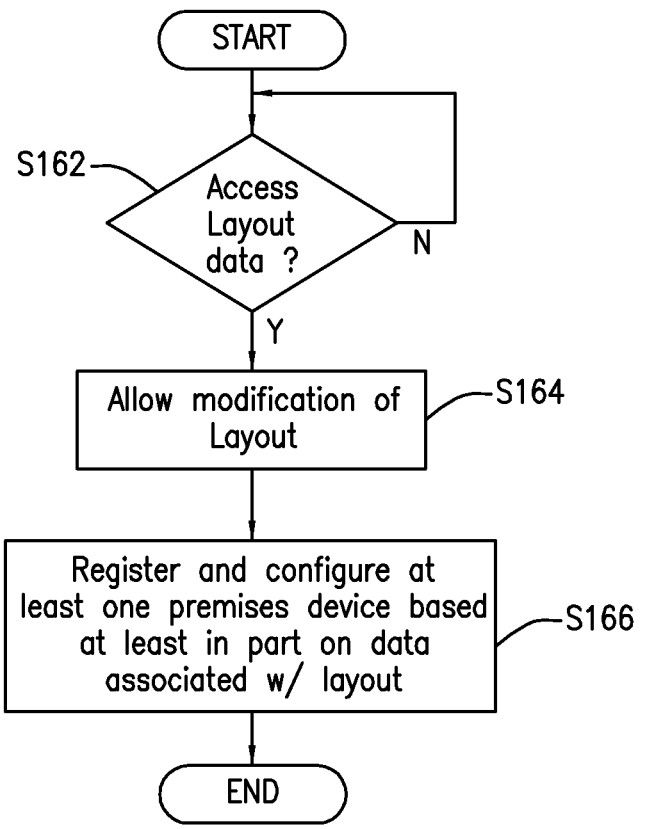
FIG. 9 is a flow chart of an exemplary installation process in accordance with the principles of the invention.

An exemplary installation process is illustrated in FIG. 9. The installation process is directed to streamlining the premises based system installation process by providing an installer, user or technician with a layout, i.e., layout of the premises based system and corresponding premises based system components. Processor 72 determines whether to access layout data associated with a consumer and/or premises from layout database 17 (Block S162). For example, layout interface device 15 may download the layout data or may access the layout data via a website interface. The accessed layout data associated with the layout may include configuration data for premises devices 14 installed at a premises.

The layout data may be accessed based on customer number or address from layout database 17 using layout interface device 15. For example, an installer may download the populated layout, i.e., populated layout data, before arriving at the installation premises in order to: check if the populated layout presents challenges such as requiring long ladders or special tools, confirm the number of devices and types of parts required, identify up-sale opportunities and ensure appropriate devices are on the truck in case the installer is able to complete the up-sale. The populated layout data accessed from layout database 17 may include customer account information, system configuration, device count, device location, device configuration, communications configuration (broadband, cellular, etc.), life safety account information, life style account information and floor-plan and device layout/specifications. If processor 72 determines not to access layout data, processor 72 may perform the determination of Block S162.

If processor 72 determines to access, e.g., download or access via website, layout data, processor 72 allows modification of the populated layout corresponding to the layout data as described with respect to Block S152 (Block S164). Processor 72 causes registration and configuration of at least one premises device based at least in part on the layout data, e.g., device configuration data, associated with the populated layout (Block S166). For example, installation module 53 may work with radio activation protocol (RAP) to allow premises devise 14 enrollment and activation.

Furthermore, remote monitoring center 20 may use the populated layout or home view layout to notify the consumer or emergency responders of the layout of the home and where an alarm was triggered. While layout interface device 15 and/or control unit 16 are illustrated as including one or another of layout module 76 and installation module 78, device 15, user interface device 12 and/or control unit 16 may be modified to include only one of the modules 76 or 78. For example, layout module 76 may be downloaded to layout interface device 15, i.e., mobile phone, belonging to a consumer but will not be allowed to download installation module 78. Alternatively, layout module 76 and/or installation module 78 may run on a server that is accessible by a consumer and/or technician via the internet, i.e., a web-based software application. For example, a consumer can access the web-based sales software application in order to "play around" with the layout tools but the consumer may have to register with the security company in order to save the populated layout in layout database 17.

Figure 10:
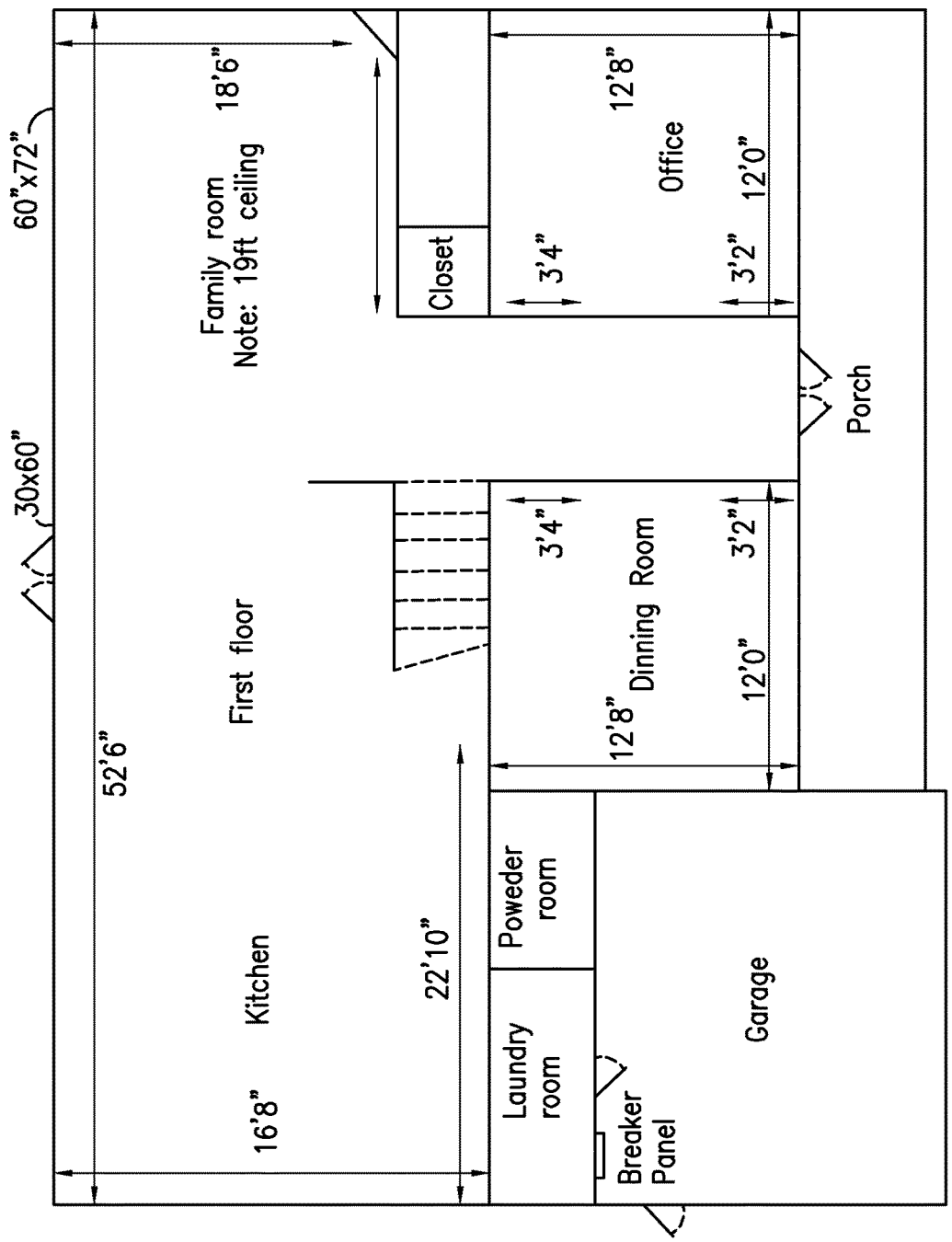
FIG. 10 is an exemplary layout generated in accordance with the principles of the invention.
Figure 11:
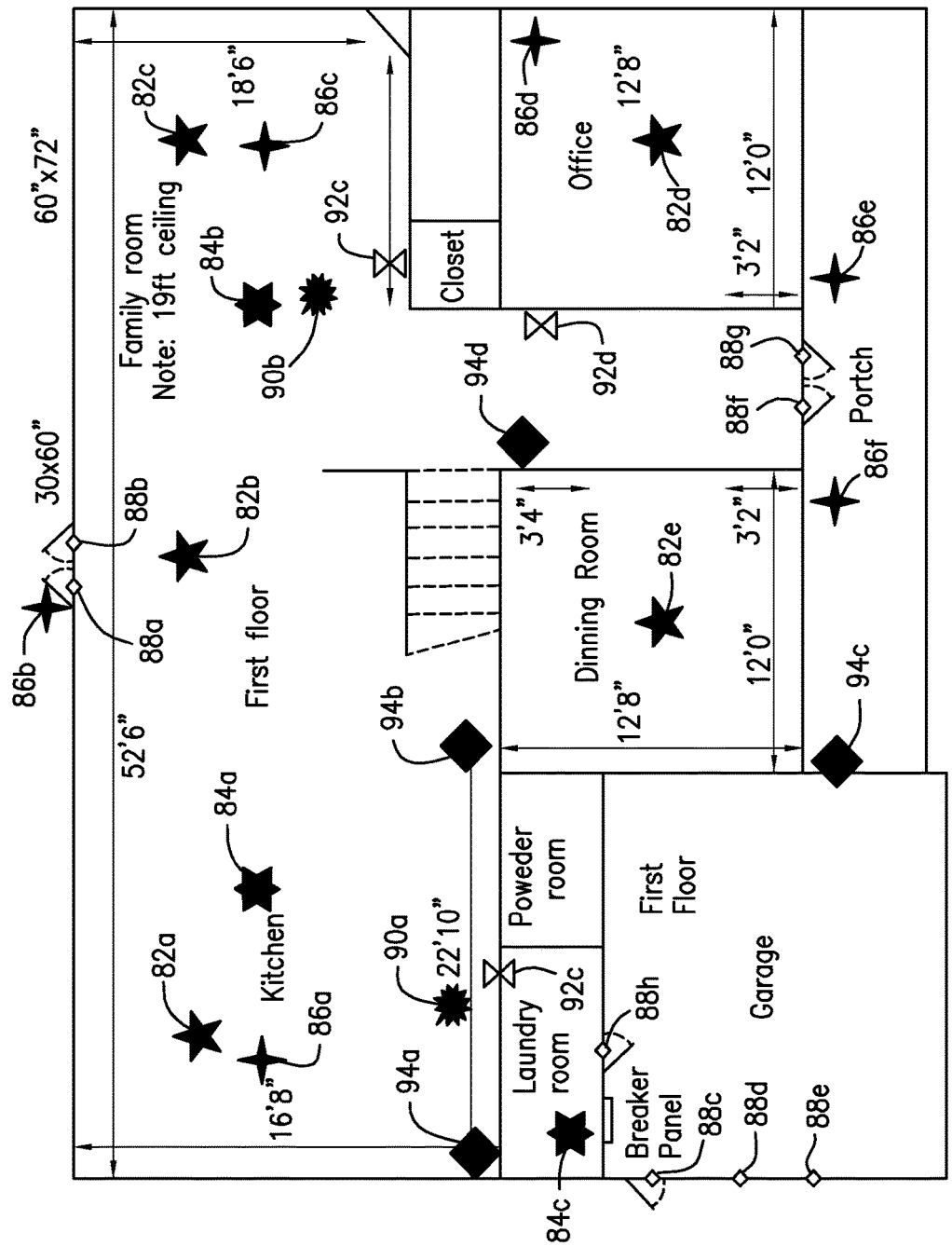
FIG. 11 is an exemplary populated layout in accordance with the principles of the invention.

FIG. 10 illustrates an example layout generated manually by a user and/or by a layout generation tool. For example, the first floor of a premises to be monitored has been modeled in a layout in which dimensions and room labels are added by the generation tool and/or user. FIGS. 11-13 illustrate a layout populated by application of premises rules and/or manual user population of premises devices. For example, FIG. 11 illustrates various premises devices 14 such as glass break sensors 82a-e, smoke sensors 84a-e, light sensors 86a-j, contact sensors 88a-e, CO sensors 90a-c, motion sensors 92a-d and cameras 94a-e, among other sensors or monitoring devices that may be located at the premises.

Further, the layout may illustrate the monitoring zones for one or more premises device 14 such that the user is able to easily identify the differences in monitoring between service packages and is able to identify unmonitored areas of the premises. For example, the monitoring area/zone of motion sensor 92*a*, monitoring area/zone of 82*c* and other monitoring areas/zones are illustrated in FIG. 12. Illustrating one or more monitoring areas/zones of one or more premises devices 14 allows a user and/or installer to visualize on display 71 the premises areas being monitored by one or more premises device 14 correspond to one or more service packages. The monitoring area/zone for each premises device 14 and/or other components of premises based system 10 may be predefined and stored in layout database 17. Further, the monitored area of one or more premises devices 14 may be displayed via display 71 at other times during the layout generation process and/or installation process.

Further, as discussed above with respect to FIG. 8, different service packages may correspond to a different number of premises devices 14 and/or premises device 14 types. Illustrating the various coverage areas/zones corresponding to one or more service packages allows the user and/or customer to visualize which areas of the premises is being monitored and by which premises device 14. Further, the installer advantageously is able determine the location of each premises device 14 based on the layout such as to ensure premises devices 14 are installed in the proper location.

FIG. 14 illustrates a screenshot of order summary 96 in the sales layout process that can be displayed to the user of layout interface device 15 via display 71. Order summary 96 includes at least a devices to be installed section 98 (referred to as "section 98") and pricing section 100. Section 98 displays the various premises devices 14 and/or other components of premises based system 10 to be installed at a premises. Further, section 98 may indicate how many premises devices and/or other components are being installed on each floor of the premise, and the total number of each premises device 14 and/or other component being installed at the premises. For example, section 98 may indicate that the first floor of premises is to include three motion detectors/sensors while the entire premises is to include five motion detectors. Section 98 may be populated based at least in part on data associated with the premises such as a layout of the premises. The order summary 96 screen may prompt the user or customer to confirm placement of an order for the installation of the premises based system at the premises.

Furthermore, order summary 98 may include pricing section 100 that indicates a total number of premises devices 14 and/or other components to be installed at the premise, unit fee, installation fee per unit, monthly fee, total fee and/or total monthly fee, among other pricing data. Order summary 96 allows a user and/or customer to confirm the accuracy of the order or return to the populated layout for modification.

Although the invention is described with reference to a particular embodiment of a premises based system, the invention is not limited to such. It is contemplated that the invention can be implemented with any suitable premises based system hardware, including traditional panel-based premises based systems.

The invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. An apparatus for a premises based system, the apparatus comprising:
a processor, the processor configured to:
generate a layout of at least a portion of a premises to be monitored by the premises based system;
populate the layout with a plurality of service packages based at least in part on at least one characteristic of a plurality of premises devices and a plurality of premises rules, each of the plurality of service packages corresponding to at least one premises device of the plurality of premises devices, the populated layout indicating a monitoring area of each of the plurality of premises devices and indicating to which one of the plurality of service packages each monitoring area belongs, the plurality of premises rules including:
a first rule for populating the layout with a first premises device of the plurality of premises devices based on a room type of the premises;
cause layout data associated with the populated layout to be stored; and
cause transmission of the layout data associated with the populated layout to a premises control unit to register and configure at least one of the plurality of premises devices based on the layout data.

2. The apparatus of claim 1, wherein the plurality of premises rules includes a second rule for populating the layout with a second premises device of the plurality of premises devices based on a monitoring area of the second premises device.

3. The apparatus of claim 2, wherein the plurality of premises rules includes a third rule for populating the layout with at least one of the plurality of premises devices based on a manual user selection of the at least one premises device.

4. The apparatus of claim 1, wherein the layout is populated with a plurality of premises devices corresponding to a plurality of service packages, each service package corresponding to at least one of a different number and different type of premises device than the other service packages.

5. The apparatus of claim 4, wherein at least one monitoring area of at least one premises device is illustrated in the layout.

6. The apparatus of claim 1, wherein the plurality of premises rules includes a fourth rule for populating the layout with at least one of the plurality of premises devices based on a sensor type of the at least one of the plurality of premises devices.

7. The apparatus of claim 1, wherein the layout data indicates whether the layout was at least one of populated by applying the plurality of premises rules and by manual user selection of the at least one premises device.

8. The apparatus of claim 7, wherein if the layout was populated by at least manual user selection, the processor is further configured to:
   apply the plurality of premises rules to the layout;
   determine differences between the layout populated by at least manual user selection and the layout populated by applying the plurality of premises rules; and
   store the determined differences in the layout data.

9. The apparatus of claim 1, wherein the layout is generated based at least on one of captured images of the at least the portion of the premises to be monitored, a predefined floor layout template and manual user interaction with a drawing tool.

10. The apparatus of claim 1, wherein the at least one premises device includes at least one of a smoke detector, glass break sensor, camera and motion detector.

11. A system for a premises based system, the system comprising:
   an apparatus including:
      a first processor, the first processor configured to:
         generate a layout of at least a portion of a premises to be monitored by the premises based system;
         populate the layout with a plurality of service packages based at least in part on at least one characteristic of a plurality of premises devices and a plurality of premises rules, each of the plurality of service packages corresponding to at least one premises device of the plurality of premises devices, the populated layout indicating a monitoring area of each of the plurality of premises devices and indicating to which one of the plurality of service packages each monitoring area belongs, the plurality of premises rules including:
            a first rule for populating the layout with a first premises device of the plurality of premises devices based on a room type of the premises; and
         cause layout data associated with the populated layout to be stored, the layout data including configuration data for each of the plurality of premises devices; and
   a premises control unit, the control unit including:
      a communication interface, the communication interface configured to receive the configuration data for at least one premises device; and
      a second processor, the second processor configured to:
         register and configure at least one of the plurality of premises devices based at least in part on the received configuration data; and
         monitor the registered and configured plurality of premises devices.

12. The system of claim 11, wherein the layout is populated with a plurality of premises devices corresponding to a plurality of service packages, each service package corresponding to at least one of a different number and different type of premises device than the other service packages.

13. The system of claim 12, wherein at least one monitoring area of at least one premises device is illustrated in the layout.

14. The system of claim 11, wherein the at least one premises device includes at least one of a smoke detector, glass break sensor, window sensor, door sensor, carbon monoxide sensor, camera and motion detector.

15. The system of claim 14, wherein the plurality of premises rules includes a second rule for populating the layout with a second premises device of the plurality of premises devices based on a monitoring area of the second premises device.

16. The system of claim 11, wherein the plurality of premises rules includes a third rule for populating the layout with at least one of the plurality of premises devices based on a manual user selection of the at least one premises device.

17. The system of claim 16, wherein if the layout was populated by at least manual user selection, the second processor is further configured to:
   apply the plurality of premises rules to the layout;
   determine differences between the layout populated by at least manual user selection and the layout populated by applying the plurality of premises rules; and
   store the determined differences in the layout data.

18. The system of claim 11, wherein the plurality of premises rules includes a fourth rule for populating the layout with at least one of the plurality of premises devices based on a sensor type of the at least one of the plurality of premises devices.

19. The system of claim 11, wherein the layout data indicates whether the layout was at least one of populated by applying the plurality of premises rules and by manual user selection of the at least one premises device.

20. The system of claim 11, wherein the layout is generated based at least on one of captured images of the at least the portion of the premises to be monitored, a predefined floor layout template and manual user interaction with a drawing tool.

21. The system of claim 11, wherein the control unit modifies the populated layout received from the database to generate a modified version of the populated layout; and
   the communication interface further configured to transmit the modified version of the populated layout to a database for future retrieval.

22. The system of claim 21, wherein the layout data indicates whether the layout was at least one of populated by applying the plurality of premises rules and by manual user selection of the at least one premises device.

23. A method for a premises based system, the method comprising:
   generating a layout of at least a portion of a premises to be monitored by the premises based system;
   populating the layout with a plurality of service packages based at least in part on at least one characteristic of a plurality of premises devices and a plurality of premises rules, each of the plurality of service packages corresponding to at least one premises device of the plurality of premises devices, the populated layout indicating a monitoring area of each of the plurality of premises devices and indicating to which one of the plurality of service packages each monitoring area belongs, the plurality of premises rules including:
      a first rule for populating the layout with a first premises device of the plurality of premises devices based on a room type of the premises;

causing layout data associated with the populated layout to be stored; and causing transmission of the layout data associated with the populated layout to a premises control unit to register and configure at least one of the plurality of premises devices based on the layout data.

24. The method of claim 23, wherein the plurality of premises rules includes a second rule for populating the layout with a second premises device of the plurality of premises devices based on a monitoring area of the second premises device.

25. The method of claim 24, wherein the plurality of premises rules includes a third rule for populating the layout with at least one of the plurality of premises devices based on a manual user selection of the at least one premises device.

26. The method of claim 23, wherein the layout data indicates whether the layout was at least one of populated by applying the plurality of premises rules and by manual user selection of the at least one premises device; and if the layout was populated by at least manual user selection, further comprising:

applying the plurality of premises rules to the layout;

determining differences between the layout populated by at least manual user selection and the layout populated by applying the plurality of premises rules; and storing the determined differences in the layout data.

27. The method of claim 23, wherein the layout is populated with a plurality of premises devices corresponding to a plurality of service packages, each service package corresponding to at least one of a different number and different type of premises device than the other service packages.

28. The method of claim 23, wherein at least one monitoring area of at least one premises device is illustrated in the layout.

* * * * *